US011873848B2

(12) United States Patent
Junker et al.

(10) Patent No.: US 11,873,848 B2
(45) Date of Patent: Jan. 16, 2024

(54) HYDRAULIC CONTROL BLOCK AND HYDRAULIC AXLE THEREWITH

(71) Applicant: Robert Bosch GmbH, Stuttgart (DE)

(72) Inventors: Markus Junker, Mainhausen (DE); Manuel Rumpel, Karlstadt (DE)

(73) Assignee: Robert Bosch GmbH, Stuttgart (DE)

(*) Notice: Subject to any disclaimer, the term of this patent is extended or adjusted under 35 U.S.C. 154(b) by 111 days.

(21) Appl. No.: 17/619,556

(22) PCT Filed: Jun. 19, 2020

(86) PCT No.: PCT/EP2020/067071
§ 371 (c)(1),
(2) Date: Dec. 15, 2021

(87) PCT Pub. No.: WO2020/260146
PCT Pub. Date: Dec. 30, 2020

(65) Prior Publication Data

US 2022/0381269 A1 Dec. 1, 2022

(30) Foreign Application Priority Data

Jun. 27, 2019 (DE) ..................... 10 2019 209 328.0
Jul. 18, 2019 (DE) ..................... 10 2019 210 622.6

(51) Int. Cl.
*F15B 21/00* (2006.01)
*F15B 15/20* (2006.01)
*F15B 13/00* (2006.01)

(52) U.S. Cl.
CPC .......... *F15B 21/003* (2013.01); *F15B 15/202* (2013.01); *F15B 2013/006* (2013.01); (Continued)

(58) Field of Classification Search
CPC .. F15B 15/1471; F15B 15/149; F15B 15/202; F15B 21/003; F15B 2013/006
See application file for complete search history.

(56) References Cited

U.S. PATENT DOCUMENTS 2,536,565 A * 1/1951 Ostergren ................ F16J 15/34 416/157 R
2,897,786 A * 8/1959 Geyer ................ F15B 11/0365 91/183

(Continued)

FOREIGN PATENT DOCUMENTS

EP 1 316 732 A1 6/2003
JP 54053773 A * 4/1979 ............ F15B 15/149

(Continued)

OTHER PUBLICATIONS

JP54053773A_t machine translation thereof (Year: 1979).*

(Continued)

*Primary Examiner* — Kenneth Bomberg
*Assistant Examiner* — Matthew Wiblin
(74) *Attorney, Agent, or Firm* — Maginot, Moore & Beck LLP

(57) ABSTRACT

A hydraulic control block for controlling a supply of pressurizing medium to an electrohydraulic or servo hydraulic axle includes a plurality of internally situated hydraulic interfaces configured to fluidically connect at least one of a source of pressurizing medium and a pressurizing medium sink of the axle to any hydraulic cylinder selected from a group of hydraulic cylinders of different structural forms, wherein the internally situated hydraulic interfaces are configured to selectively supply pressurizing medium to the selected hydraulic cylinder. The control block further includes an insert part configured as a function of the structural form of the selected hydraulic cylinder such that each of the plurality of internally situated hydraulic interfaces is one of tapped and blocked for the purpose of the fluidic connection.

20 Claims, 14 Drawing Sheets

(52) U.S. Cl.
CPC ................. *F15B 2211/7054* (2013.01); *F15B 2211/7056* (2013.01)

(56) References Cited

U.S. PATENT DOCUMENTS

| | | | | |
|---|---|---|---|---|
| 3,233,523 | A | 2/1966 | Passaggio | |
| 3,777,621 | A * | 12/1973 | Blok | F15B 15/149 92/162 R |
| 3,824,900 | A | 7/1974 | McLelland | |
| 4,597,322 | A * | 7/1986 | Garnjost | F15B 15/149 92/60 |
| 6,435,205 | B1 * | 8/2002 | Hattori | F15B 13/0892 137/271 |
| 2005/0229776 | A1 * | 10/2005 | Kriegsmann | F15B 15/149 92/85 B |
| 2008/0253906 | A1 * | 10/2008 | Strong | F15B 15/204 91/418 |
| 2009/0007770 | A1 * | 1/2009 | Kriegsmann | F15B 15/1428 91/55 |
| 2017/0328387 | A1 * | 11/2017 | Pryssander | F15B 15/2846 |

FOREIGN PATENT DOCUMENTS

| | | | |
|---|---|---|---|
| WO | 2005/106257 | A1 | 11/2005 |
| WO | 2012/167892 | A2 | 12/2012 |
| WO | 2018/202290 | A1 | 11/2018 |

OTHER PUBLICATIONS

International Search Report corresponding to PCT Application No. PCT/EP2020/067071, dated Sep. 24, 2020 (German and English language document) (6 pages).

* cited by examiner

HYDRAULIC CONTROL BLOCK AND HYDRAULIC AXLE THEREWITH

This application is a 35 U.S.C. § 371 National Stage Application of PCT/EP2020/067071, filed on Jun. 19, 2020, which claims the benefit of priority to Serial No. DE 10 2019 209 328.0, filed on Jun. 27, 2019 in Germany, and which claims the benefit of priority to Serial No. DE 10 2019 210 622.6, filed on Jul. 18, 2019 in Germany, the disclosures of which are incorporated herein by reference in their entirety.

The disclosure relates to a hydraulic control block and to a hydraulic axle having the control block.

Generic hydraulic axles have an input drive module and an output drive module. The input drive module here comprises a drive motor, for example an electric motor, in particular a servo motor, which is connected via a clutch to a drive shaft of a hydraulic machine that takes the form of a hydraulic pump. The said hydraulic machine is fluidically and mechanically connected to a hydraulic control block. Particularly compact designs house the engine, or at least some sections of the engine of the hydraulic machine, in the control block. The output drive side is formed by a hydraulic cylinder or generally by a hydraulic actuator. This too is fluidically and mechanically connected to the control block, which results in an arrangement that is overall spatially and mechanically compact for the axle.

SUMMARY

The mechanical and hydraulic connection between the input drive module and the actuator is matched specifically to the actuator itself and the criteria that it satisfies. Thus, the manner of construction of the cylinder in terms of the number and arrangement of the piston surfaces, such as for example a two-chamber or three-chamber cylinder, the diameter of the piston, the diameter of the piston rod, the diameter of the cylinder tube, and various standardized types of mounting for the actuator, such as for example mounting by means of a head flange or a trunnion, need to be taken into consideration. A further criterion is a guide and sealing system, such as the orientation of the input drive module relative to the actuator.

Conventional hydraulic control blocks here prove to be relatively inflexible because the orientation of the input drive module is fixed and cannot be changed. In addition, in the case of an existing product portfolio of electrohydraulic axles, a high number of different components must be used because of the criteria mentioned.

The variation in the potentially usable actuators, in particular hydraulic cylinders, results in a wide variation of control block designs because an individual mechanical and hydraulic connection solution must be found for each hydraulic cylinder. This represents considerable expense in terms of construction, manufacturing, and management of the construction and manufacturing data. Basically, the large variation in possible hydraulic cylinders has to be copied on the hydraulic control block. If the latter also has different alternative forms, such as for example different possible hydraulic circuits, multiplying the two variant objects gives a high number of configurations which need to be managed and maintained.

On the other hand, the object of the disclosure is to provide a hydraulic control block for a hydraulic, in particular electrohydraulic, axle which allows a high degree of variation at low cost. The object is furthermore to provide a hydraulic, in particular an electrohydraulic, axle with a high degree of variation and likewise with a low cost.

The first object is achieved by a hydraulic control block according to the disclosure, the second by a hydraulic axle according to the disclosure.

Advantageous developments of the disclosures are described herein.

For the purpose of controlling the supply of pressurizing medium to a hydraulic cylinder of a hydraulic, in particular electrohydraulic or servo hydraulic, axle, a hydraulic control block has hydraulic interfaces which are arranged in the control block and are fluidically connectable, in particular are connected and in particular can be brought into fluidic connection, to a source of pressurizing medium and/or to a pressurizing medium sink of the axle via the piston surfaces of the hydraulic cylinder. The source of pressurizing medium is preferably a high-pressure side of a hydraulic machine, and the pressurizing medium sink its low-pressure side or a tank.

According to the disclosure, the internally situated hydraulic interfaces are provided for the purpose of selectively supplying pressurizing medium to hydraulic cylinders of different structural forms. For this purpose, an insert part which is arranged at least partially in the control block, in particular in a base body of the control block, and is configured specifically as a function of the structural form of the hydraulic cylinder is inserted removably or is provided so that it is removably insertable, by means of which each of the internally situated hydraulic interfaces is either fluidically tapped or fluidically blocked for the purpose of fluidic connection.

As a result, the respective variation in the combinations of possible structural forms of the control block and the hydraulic cylinder, which conventionally entails an individual control block for each structural form of the hydraulic cylinder, is shifted to the insert part. With one, in particular only one, structural form of the control block, it is thus possible for a plurality of structural forms of the hydraulic cylinder to be supplied with pressurizing medium without there being any need to change the control block, to be more precise its base body. Only the insert part has to be adapted or replaced when a hydraulic cylinder of a different structural form needs to be connected. The complexity and costs of construction, manufacturing, storing, and adapting the control block are consequently reduced. The said complexity and costs are thus shifted to the component of the insert part which is significantly simpler to construct, manufacture, store, and adapt and are consequently reduced. The control block thus enables a high degree of variation with little complexity.

The insert part preferably bears at least partially inside the base body of the control block. By means of its stable bearing in the control block, in addition to the mentioned tapping and/or blocking of the internally situated hydraulic interfaces, the insert part enables the hydraulic cylinder to bear, be guided, and/or be fastened in and/or on the control block.

In an alternative, the insert part is designed as an adapter which is or can be removably connected to the hydraulic cylinder.

In a development, the adapter has, depending on the structural form, at least one tapping point or at least one blocking point on the control block side and/or on the hydraulic cylinder side.

Alternatively, the insert part is formed as a structural unit with the hydraulic cylinder. In other words, the respective structural form of the hydraulic cylinder has specific, adapter-like geometries for tapping and/or blocking the internally situated hydraulic interfaces. In particular, the insert part is formed integrally with a section of the hydraulic cylinder or by a section of the hydraulic cylinder. The section is in particular a housing section, in particular a section of a cylinder head, cylinder base, or cylinder tube of the hydraulic cylinder.

In a development, the items delivered or an arrangement of the control block include a plurality of insert parts, in particular adapters, configured as a function of different structural forms of the hydraulic cylinder, wherein only one insert part or adapter is used. The arrangement can here have one or more insert parts or adapters. The applicant reserves the right to make such a scope of supply or such an arrangement the subject of a patent claim and/or application.

In a development, all the internally situated hydraulic interfaces, or at least a minority thereof, are tapped by the insert part.

In a development, each of the tapped internally situated hydraulic interfaces is fluidically connected to a piston surface, permanently assigned thereto, of the hydraulic cylinder.

The structural form of the hydraulic cylinder, and hence the respective configuration of the insert part, in particular the adapter, adapted thereto is determined in a development at least by the number of piston surfaces, in particular the configuration of the cylinder with one, two, three, or more surfaces or chambers, and/or by the piston surface ratio, in particular the configuration as a double-rod cylinder, a differential cylinder, a tandem cylinder, or a telescopic cylinder, and/or by the cylinder diameter in the form of a piston diameter and/or a cylinder tube outer diameter, of the hydraulic cylinder. The variation here resides solely with the insert part, in particular the adapter.

The hydraulic interfaces can be arranged inside the control block in the region of the insert part, in particular the adapter, but they do not all have to be. At least one hydraulic interface can be arranged on the outside of or on the hydraulic control block. A piston space far removed from the control block can then thus in particular be supplied with pressurizing medium.

In a development, none of the internally situated hydraulic interfaces are tapped by the insert part and instead all of them are blocked by it. The supply of pressurizing medium to the hydraulic cylinder is then provided only via the at least one externally situated hydraulic interface of the control block. The number of internally situated and externally situated hydraulic interfaces preferably add up to a maximum number of piston surfaces of the different structural forms. In the case of only internally situated hydraulic interfaces, their number is preferably the same as this maximum number of piston surfaces.

In a development, a recess or through recess, preferably a bore or through bore, into which the insert part, in particular the adapter, is inserted is provided in the control block in a simple manufacturing process and with a high degree of precision.

In a development, the bore or through bore is here introduced into a side face of the control block, into which it opens with a radial widened portion, forming a bearing shoulder. The insert part, in particular the adapter, is inserted into the bore or through bore, wherein a radial collar of the insert part, in particular the adapter, is supported on the bearing shoulder.

In a development, the through bore is symmetrical with respect to the direction of the bore, i.e. with respect to a plane with a normal which is the direction of the bore, or has at least a symmetrical basic shape, in particular disregarding any notches, subsequent machining, or the like.

The radial widened portion or bearing shoulder is then preferably provided at both end sections of the through bore. As a result, the insert part, in particular the adapter, and hence in particular the hydraulic cylinder can be inserted rotated by 180° about its vertical axis.

The internally situated hydraulic interfaces preferably in each case have at least one opening into the bore or through bore.

In a development, these openings are spaced apart from one another, in particular axially, in the direction of the bore.

In a development, these openings extend over all or part of the inner circumference of the bore or through bore.

In particular, they extend as grooves.

A respective pressurizing medium duct which traverses the control block or its base body at least partially opens into a respective groove.

A pressurizing medium connection with three piston spaces is in particular possible if, in a development, two internally situated hydraulic interfaces are provided, a first one of which has an opening into the bore or through bore and the second two openings into the bore or through bore.

If the abovementioned two openings are arranged symmetrically with respect to the abovementioned one opening in the direction of the bore, i.e. with respect to a plane with a normal which is the direction of the bore, the hydraulic cylinder can simply be arranged rotated by in particular 180° about its vertical axis.

In order to be able to install the insert part, in particular the adapter, as reliably as possible and so that no measures need to be provided to orient it in rotation, in a development, the openings of the internally situated hydraulic interfaces are formed over the inner circumference of an inner lateral surface of the bore or through bore, in particular as grooves or annular ducts over all or part of the circumference.

A tapping point assigned to the respective opening is then formed as a transverse or radial bore in the insert part, in particular the adapter, which bore is at least partially covered by the respective opening.

Conversely, it is of course possible that the adapter-side tapping points are formed as grooves situated on the outer circumference and the openings into the bore or through bore are formed as transverse or radial ducts.

In an alternative, the insert part, in particular the adapter, is formed as an adapter socket with a through recess, in particular a through bore. The latter is traversable or traversed in particular by a piston rod of the hydraulic cylinder, as a result of which the insert part, in particular the adapter socket, is formed or can be, in particular is, arranged on the head of the hydraulic cylinder.

In a development, a guide and/or bearing point on which a piston rod of the hydraulic cylinder can be guided and/or can bear, in particular is guided and/or bears is formed on an inner lateral surface or on sections of an inner lateral surface of the through recess of the insert part, in particular the adapter socket. This important function can thus also be shifted from the base body or solid body of the hydraulic control block to the insert part, in particular the adapter or the adapter socket, which provides advantages in terms of the guiding and bearing, as well as the installing of the piston rod.

In a development, at least one sealing element is provided on an inner lateral surface or on sections of an inner lateral surface of the through recess of the insert part, in particular the adapter socket. As a result, a rod seal for separating two piston spaces can, for example, be formed, as a result of which this important function can thus also be shifted from the base body or solid body of the hydraulic control block to the insert part, in particular to the adapter or the adapter socket.

In the case of a multi-chamber, in particular tandem cylinder, in a development, one of the piston surfaces is sealable, in particular is sealed, relative to another piston surface by means of the at least one sealing element and the piston rod.

In order to supply pressurizing medium to at least two of the piston spaces of the multi-chamber cylinder, in a development, both internally situated hydraulic interfaces are tapped. Together with the at least one externally situated hydraulic interface, at least one three-chamber cylinder, in particular a tandem cylinder, can be supplied with pressurizing medium via the hydraulic interfaces.

In this document, supplying pressurizing medium is to be understood, depending on the direction of movement, as feeding or discharging pressurizing medium.

In a development, one of the piston surfaces is sealable, in particular is sealed, with respect to the atmosphere via the at least one sealing element and the piston rod.

Fewer piston surfaces can be supplied with pressurizing medium if, in a development, the insert part, in particular the adapter, is configured in such a way that one of the two internally situated hydraulic interfaces is tapped but the other is blocked. Together with the at least one externally situated hydraulic interface, at least one two-chamber cylinder, in particular a double-rod cylinder or a differential cylinder, can thus be supplied with pressurizing medium via the hydraulic interfaces.

In a development, for the differential cylinder or a two-chamber cylinder with just one piston rod, the insert part, in particular the adapter, is formed by an adapter socket with a recess at one end and a base at one end, i.e. has a more or less pot-shaped design. Here only one of the two internally situated hydraulic interfaces is tapped and the respective other one is blocked. In this way too, together with the at least one externally situated hydraulic interface, at least one two-chamber cylinder, in particular a double-rod cylinder or a differential cylinder, can be supplied with pressurizing medium via the hydraulic interfaces.

In a development, a pressurizing medium line, in particular in the form of a hydraulic tube or hose, which is guided to the outside of a base body of the control block and which is fluidically connectable or is connected to each of the piston surfaces of the hydraulic cylinder or to the assigned piston space, starts from the insert part, in particular from the adapter, from each tapping point. The advantages mentioned of the interfaces and the insert part, in particular the adapter, are thus also provided if the hydraulic cylinder is arranged at a distance and the hydraulic axle is therefore provided in a modular design.

In a development, the insert part, in particular the adapter, is retained directly or indirectly in the bore or through bore via a first cover.

In a development, a radial collar of the insert part, in particular the adapter, is clamped directly or indirectly onto a radially widened circumferential recess of the bore or through bore via a first cover.

In a development, the first cover is a first tubular or ring flange which is connected to a first cylinder tube of the hydraulic cylinder and which is fastened to a base body of the control block by means of tensioning screws.

A simple and easily removable connection is provided here if, in a development, the first ring flange is a ring nut flange which is screwed onto the outer circumference of the first cylinder tube.

In order to clamp the insert part, in particular the adapter, onto the radially widened circumferential recess of the bore or through bore of the control block, in a development, an annular end face of the first cylinder tube has a clearance relative to an annular end face of the first ring flange and is supported on a first end side of the insert part, in particular the adapter.

In a development, a second cover arranged opposite the first cover on the control block is provided, by means of which the through bore, in which the insert part, in particular the adapter, is arranged, is closed.

The second cover is here advantageously decoupled from the insert part, in particular the adapter, in terms of a flow of force.

In a development, for this purpose, the second cover is traversed by a second cylinder tube of the hydraulic cylinder stresslessly, i.e. without it being possible for forces to be transmitted between the second cover and the second cylinder tube.

In a development, the second cylinder tube is clamped onto the insert part, in particular the adapter, by means of tension rods which are anchored, in particular screwed, in a second end side of the insert part, in particular the adapter.

In order to center a cylinder tube on the insert part, in particular the adapter, and hence on the control block and/or in order to coaxially orient cylinder tubes relative to one another, the insert part, in particular the adapter, has, in a development, an annular collar at its end or an annular recess at its end, wherein the respective cylinder tube engages around the annular collar or penetrates the annular recess.

At least one sealing element is preferably arranged between the cylinder tube and the annular collar or annular recess.

In a development, the first and/or the second cover has a mounting eye for pivotably mounting the hydraulic cylinder and hence the hydraulic axle.

In a development, the control block has mounting means for mounting hydraulic cylinders with different structural forms, around a bore opening of the bore or through bore. These mounting means are preferably formed symmetrically on both sides of the through recess such that each hydraulic cylinder, in particular each structural form, can be arranged rotated by in particular 180° about its vertical axis, i.e. in two directions.

In an embodiment, a hydraulic control block for controlling a supply of pressurizing medium to an electrohydraulic or servo hydraulic axle, includes a plurality of internally situated hydraulic interfaces configured to fluidically connect at least one of a source of pressurizing medium and a pressurizing medium sink of the axle to at least one piston surface of any hydraulic cylinder selected from a group of hydraulic cylinders of different structural forms, wherein the internally situated hydraulic interfaces are configured to selectively supply pressurizing medium to the selected hydraulic cylinder. The hydraulic control block includes an insert part configured as a function of the structural form of the selected hydraulic cylinder such that each of the plurality of internally situated hydraulic interfaces is one of tapped and blocked for the purpose of the fluidic connection, and one of a bore and through bore into which the insert part is inserted. The plurality of internally situated hydraulic interfaces includes a first internally situated hydraulic interface with a first opening into the one of the bore and the through bore, and a second internally situated hydraulic interface with two second openings into the one of the bore and the through bore.

In one or more embodiments the insert part is formed by an adapter socket with a recess at its end and a base, and wherein one of the two internally situated hydraulic interfaces are tapped and the respective other is blocked.

In one or more embodiments a pressurizing medium line, via which the tapped interface can be fluidically connected outside a base body of the control block, starts from the insert part for each tapped internally situated hydraulic interface.

In one or more embodiments the insert part is held directly or indirectly in the bore or through bore via a first cover.

In one or more embodiments the radial collar of the insert part is clamped directly or indirectly onto the radially widened circumferential recess via a first cover.

In one or more embodiments the first cover has a first ring flange which is connected to a first cylinder tube of the hydraulic cylinder and which is fastened to a base body of the control block by means of tensioning screws.

In one or more embodiments the first ring flange is a ring nut flange which is screwed onto the outer circumference of the first cylinder tube.

In one or more embodiments an annular end face of the first cylinder tube has a clearance relative to an annular end face of the first ring flange and is supported on a first end side of the adapter or on its radial collar.

In one or more embodiments the control block includes a second cover, by means of which the through bore is closed, arranged opposite the first cover on the control block.

In one or more embodiments the second cover is decoupled from the insert part in terms of a flow of force.

In one or more embodiments the second cover is traversed stresslessly by a second cylinder tube of the hydraulic cylinder.

In one or more embodiments the second cylinder tube is clamped onto the insert part by means of tension rods which are anchored, in particular screwed, in a second end side of the insert part.

In one or more embodiments the cylinder tube engages around an annular collar at the end of the insert part or penetrates an annular recess at the end of the insert part.

A hydraulic axle has a hydraulic control block which is configured according to at least one aspect of the preceding description, and a hydraulic cylinder, wherein at least one of its piston surfaces is fluidically connected or at least fluidically connectable to one of the internally situated hydraulic interfaces via a tapping point of the insert part, in particular the adapter, and/or wherein at least one of its piston surfaces is blocked or at least blockable relative to the internally situated hydraulic interfaces via the insert part.

BRIEF DESCRIPTION OF THE DRAWINGS

Multiple exemplary embodiments of a hydraulic control block according to the disclosure and a hydraulic axle according to the disclosure are illustrated in the drawings. The disclosure will now be explained in detail with the aid of these drawings.

In the drawings.

DETAILED DESCRIPTION

It will be illustrated below how, with the aid of different adapter sockets which can be arranged in a hydraulic control block, different structural forms of hydraulic cylinders, which can differ in particular in the number of piston surfaces and cylinder tube diameters, can be connected to the same hydraulic control block base body, and more broadly to the same hydraulic input drive module.

Figure 1A:
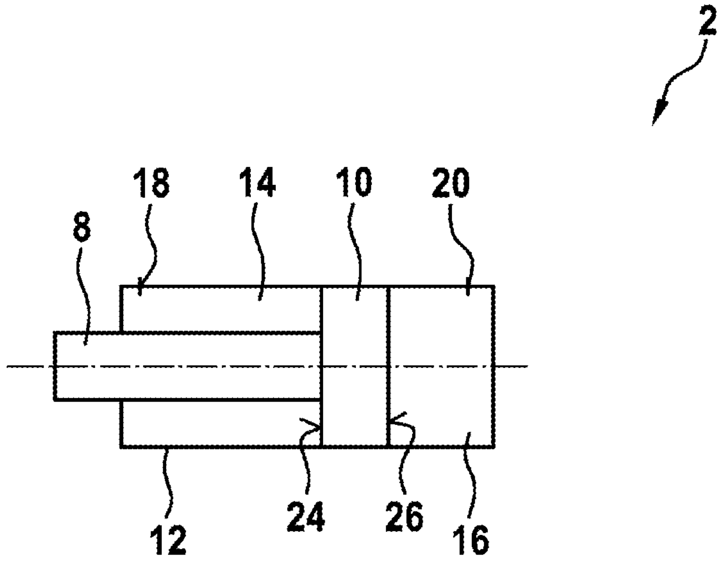
FIGS. 1*a* to *c* show different structural forms of a hydraulic cylinder in a schematic illustration, FIGS. 2*a* to *c* each show a hydraulic axle according to the disclosure, based on a differential cylinder, according to a first to third exemplary embodiment, FIGS. 3*a* to *c* each show a hydraulic axle according to the disclosure, based on a double-rod cylinder, according to a fourth to sixth exemplary embodiment, FIGS. 4*a* and *b* each show a hydraulic axle according to the disclosure, based on a tandem cylinder, according to a seventh to ninth exemplary embodiment.
Figure 1B:
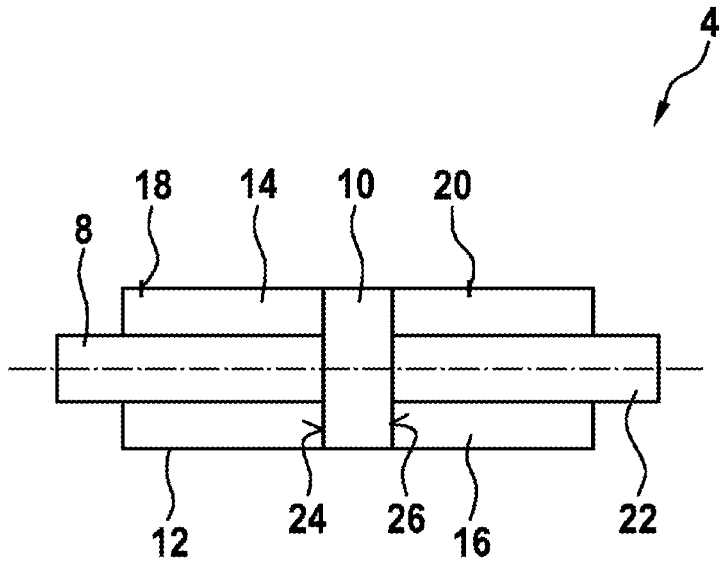
Figure 1C:
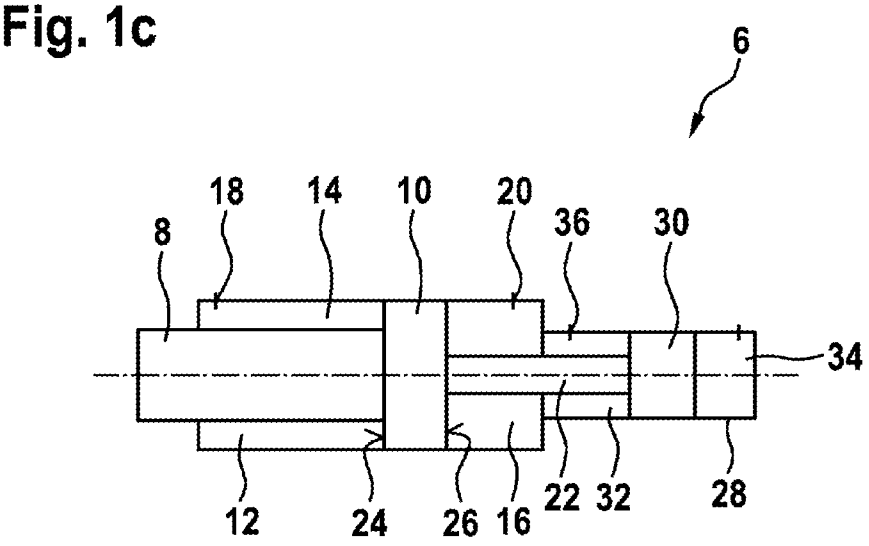
Figure 2A:
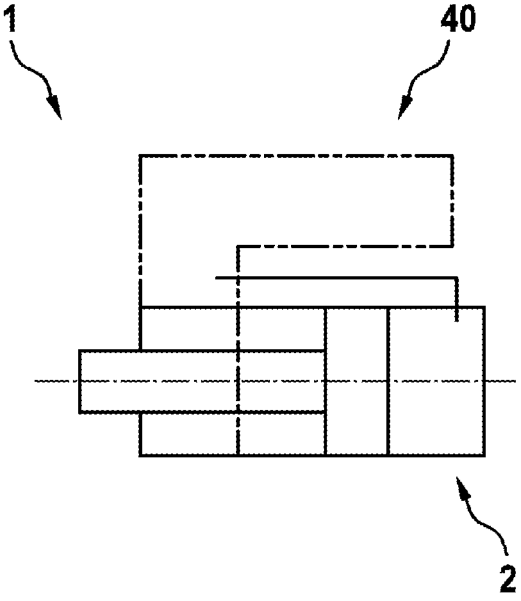
Figure 2B:
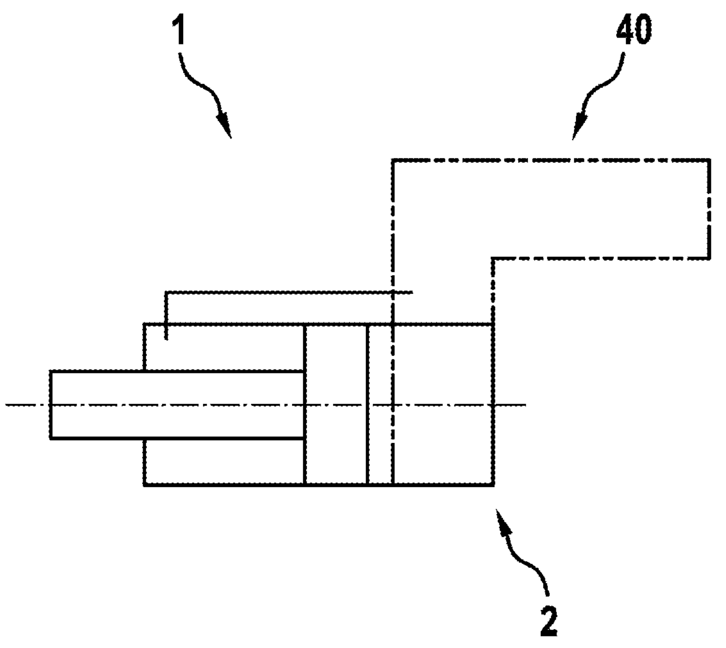
Figure 2C:
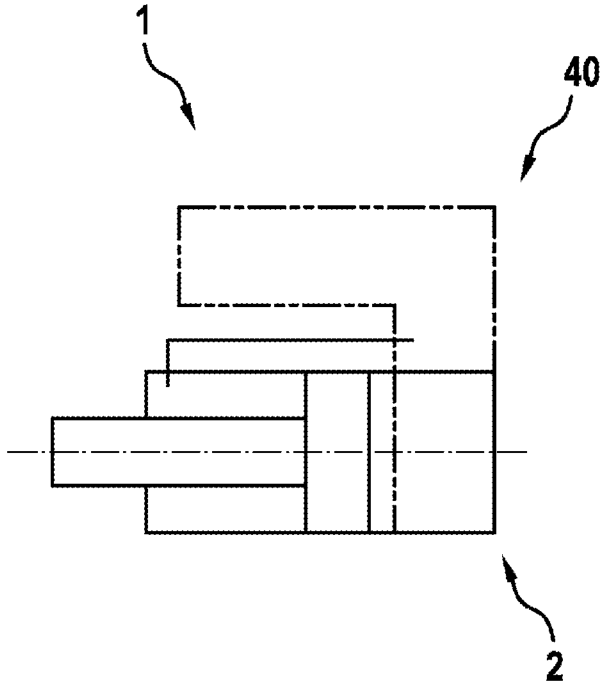

FIGS. 1*a* to 1*c* show different structural forms of hydraulic cylinders. FIG. 1*a* shows a differential cylinder 2 with a first piston rod 8 on which a first piston 10 is arranged. The latter is guided in a first cylinder tube 12 and separates a first annular piston space 14 from a second piston space 16 at the base. The piston spaces 14, 16 can be connected fluidically to a source of pressurizing medium or a pressurizing medium sink of a hydraulic axle via a first and second hydraulic interface 18, 20. FIG. 1*b* shows a double-rod cylinder which, in a purely functional sense, has the same components 8, 10, 12, 14, 16, 18, 20 except that a second piston rod 20 is arranged on the first piston 10 and extends through the second piston space 16 and out of the cylinder tube 12, opposite the first piston rod 8. A first piston surface 24 and a second piston surface 26 are here, in contrast to the case of the differential cylinder, of the same size. FIG. 1*c* shows a tandem cylinder, a particular structural form of a multi-surface cylinder. It is a functional extension of the differential cylinder according to FIG. 1*a*. A second cylinder tube 28 adjoins the first cylinder tube 12. A second piston 30 is guided inside it. Both pistons 10, 30 are coupled via the second piston rod 22. By virtue of the separation of the two cylinder tubes 12, 28, a third and a fourth piston space 32, 34 are thus created. A third hydraulic interface 36 is provided for the purpose of supplying pressurizing medium to the third piston space 32. The fourth piston space 34 is connected only to the atmosphere and “breathes” when the piston moves. Because the diameter of the second piston 30 corresponds to the diameter of the first piston rod 8, when the tandem cylinder 6 is extended/retracted a so-called oscillating volume or differential volume occurs. Rapid and power motions can be obtained by the corresponding hydraulic application of pressurizing medium to the piston surfaces of the two pistons 10, 30.

In the exemplary embodiment shown according to FIG. 1*c*, the third hydraulic interface 36 takes the form of a branch of one of the abovementioned hydraulic interfaces.

Hydraulic cylinders of different structural forms 2, 4, 6 can, according to FIGS. 2*a* to 4*b*, be connected to an input drive module 40 with a uniform hydraulic control block base body by means of the insert part, in particular the adapter, described in the general part of the description, the hydraulic interfaces, and the mounting interfaces. The embodiment described below of the control block, its interfaces, and its insert part, in particular the adapter, here enables the extremely flexible connection of the input drive module 40 and its spatial orientation relative to the hydraulic cylinder 2, 4, 6, and vice versa.

Basically, the input drive module 40 according to Figure (illustrated with the aid of the hydraulic axle according to FIG. 4*a*) has an electric motor 42 which is coupled to a hydraulic pump 48 (illustrated schematically on the right), accommodated in a hydraulic control block 46, via a clutch 44 for the purpose of transmitting torque. The tandem cylinder 6 shown in the exemplary embodiment shown can be mentioned as the output drive module.

Figure 6:
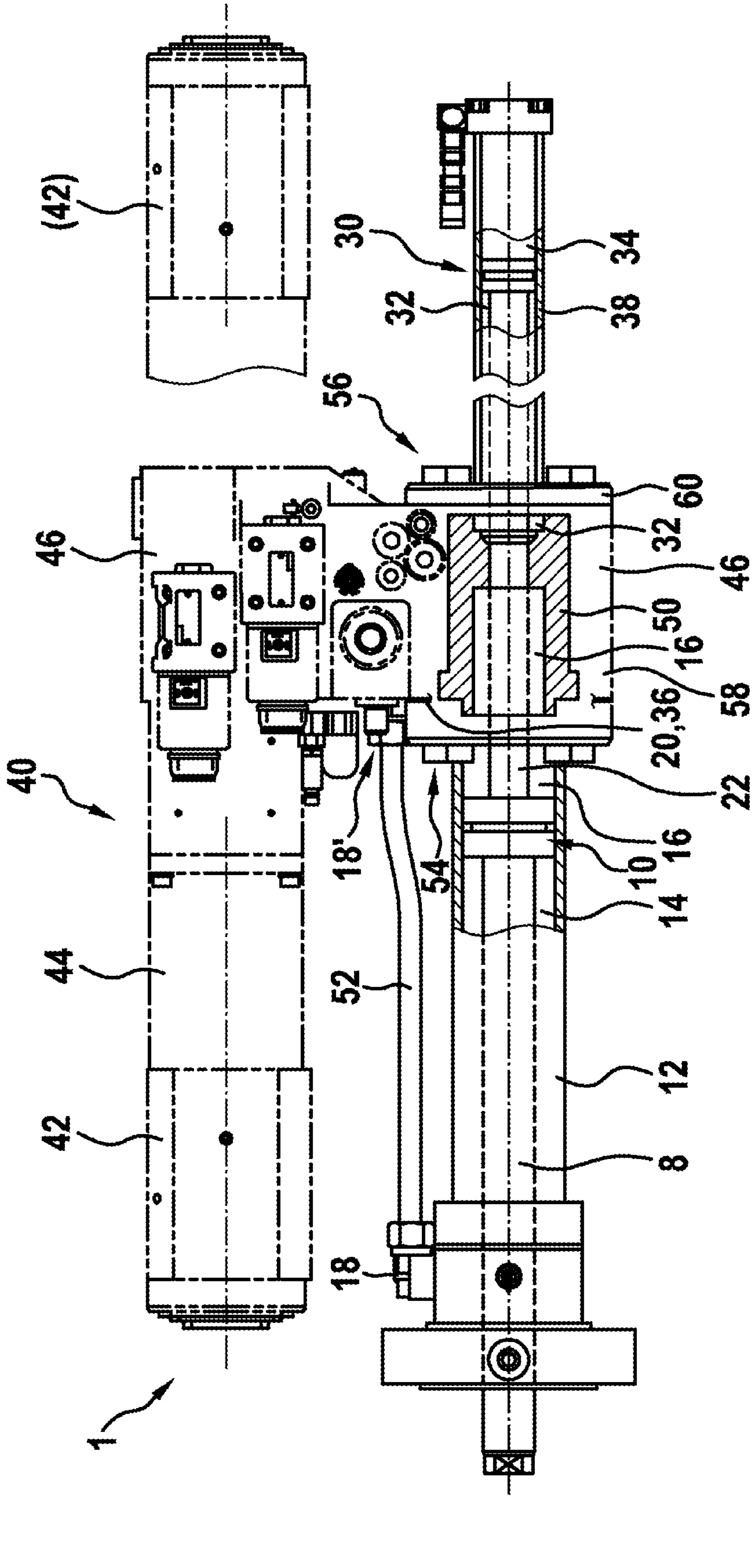
FIG. 6 shows the hydraulic axle according to FIGS. 4*a* and 5 in a partial section in the region of a control block and with an illustration of the exemplary embodiment according to FIG. 4*b*.

In FIG. 6, the hydraulic axle 1 is illustrated in a side view, partially in section. The structural form of the hydraulic axle 1 according to FIG. 4*b* is illustrated, again schematically, in the top right of FIG. 6. An adapter socket 50, adapted to the structural form of the tandem cylinder 6, is arranged in a through bore 62 in the hydraulic control block 46. The adapter socket 50 taps the second and third internally situated hydraulic interface 20, 36 and connects them to the assigned piston spaces 16, 32. A "rigid", i.e. non-switchable, fluidic connection exists between the interfaces 20, 36 and the piston spaces 16, 32 via the adapter socket 50. The first hydraulic interface 18' represents an externally situated hydraulic interface of the control block 46. It is connected, via a hydraulic tube 52 connected to the control block 46, to a cylinder port 18 which opens into the first piston space 14.

The hydraulic axle 1, or to be more precise the hydraulic control block 46, furthermore has on both sides of the through bore 62 mounting interfaces 54, 56 which are provided so that they are matched to multiple possible structural forms of the hydraulic cylinder which are provided for use with the control block 46.

The through bore 62 is closed by means of a first cover 58 on the first cylinder tube 12 side and by means of a second cover 60 on the second cylinder tube 38 side. As explained below, at least the first cover 58 assumes a mounting or clamping function for the adapter socket 50 in the respective exemplary embodiment.

Different structural forms of hydraulic cylinders 2; 4; 6 can be connected to different input drive modules 40 by means of different adapter sockets in conjunction with the hydraulic interfaces 20, 36, 18', standardized for different structural forms of hydraulic cylinders 2, 4, 6, and the mounting interfaces 54, 56 which are additionally symmetrical in such a way that a great variety of hydraulic axles 1 can be represented. This variety is achieved not by means of many differently designed control blocks 46 but by means of the combination of the variation in the structural forms 2; 4; 6 of the hydraulic cylinder and the theoretically required respective different control block 46 in the adapter socket 50.

Figure 7:
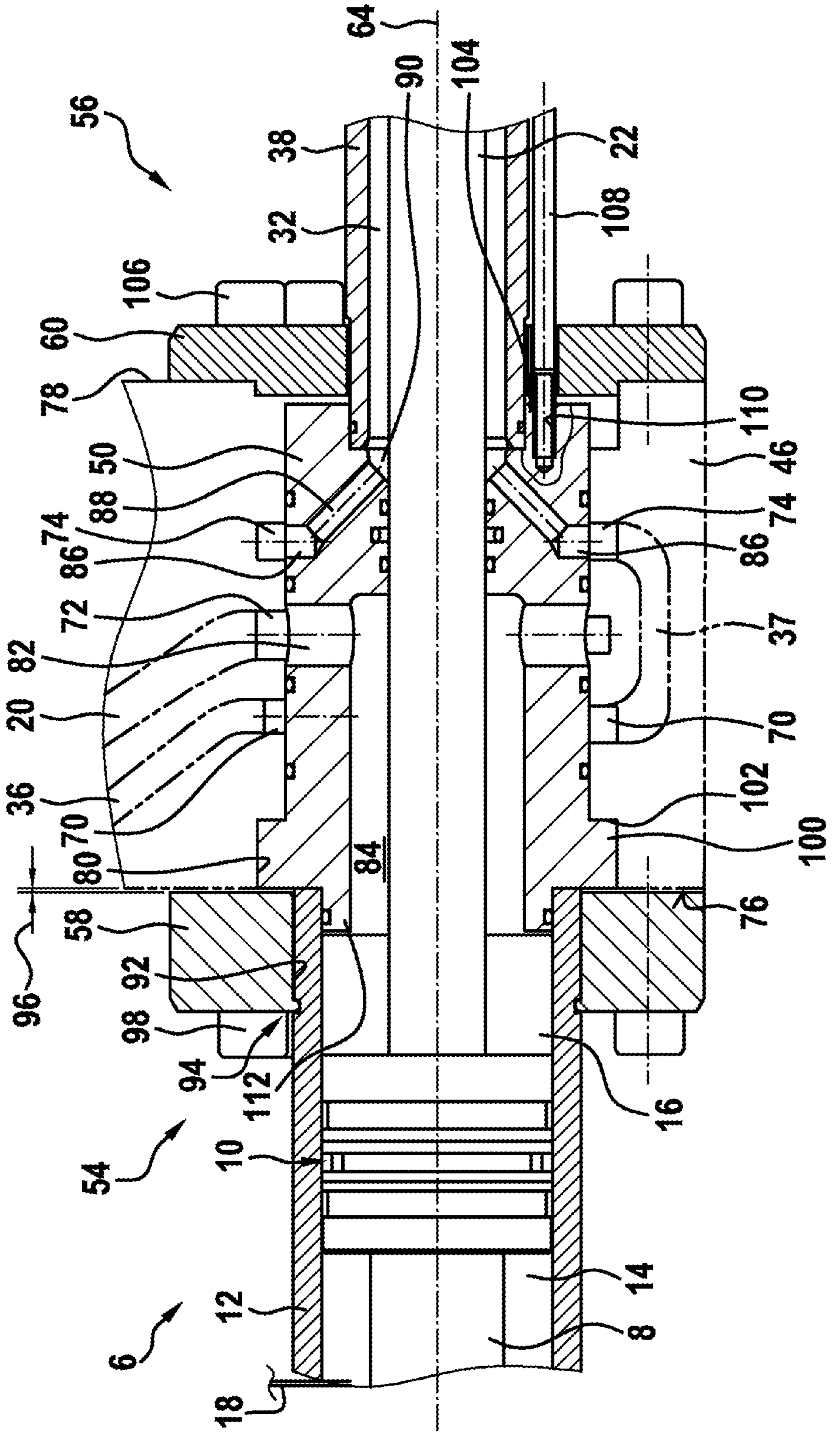
FIG. 7 shows the hydraulic axle according to FIG. 6 with an enlarged partial section in the region of the control block and of an insert part designed as an adapter socket.
Figure 8A:
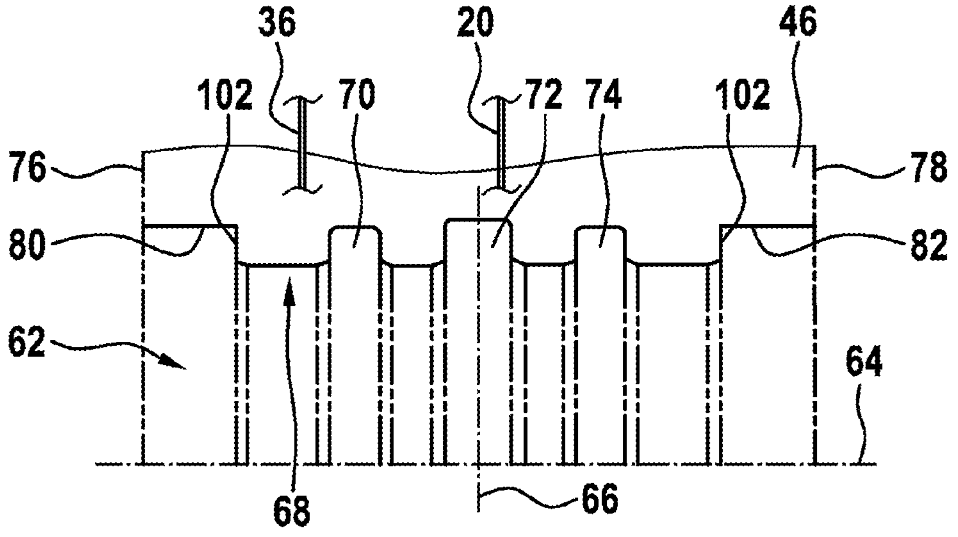
FIG. 8*a* shows hydraulic interfaces situated inside the control block, valid for all the exemplary embodiments.

According to FIG. 8*a*, a through bore 62, which has an inner lateral surface which is symmetrical with respect to a bore axis 64 and a plane of symmetry 66, is provided in the hydraulic control block 46, encompassing all structural forms 2; 4; 6. Grooves or annular ducts 70, 72, 74 are introduced into this inner lateral surface, over its whole circumference, distributed evenly and arranged symmetrically with respect to the plane of symmetry 66. The through bore 62, with radial widened portions 80, 82 which are likewise symmetrical with respect to the plane of symmetry 66, opens into the side surfaces 76, 78 of the control block 46. According to FIG. 7 and FIG. 8*a*, the groove 72 arranged centrally about the plane of symmetry 66 is assigned to the second hydraulic interface 20 arranged on the inside of the hydraulic control block 46 and is fluidically connected thereto in a permanently assigned fashion. According to FIGS. 7 and 8*a*, the grooves 70, 74 arranged distributed symmetrically with respect to the plane of symmetry 66 are assigned to the third hydraulic interface 36 arranged on the inside of the hydraulic control block and is fluidically connected thereto in a permanently assigned fashion. The groove 72 here represents an annular opening of the second hydraulic interface 20 and the grooves 70, 74 represent annular openings of the third hydraulic interface 36 into the through bore 62. The groove 74 is here fluidically connected to the third hydraulic interface 36 indirectly via a pressurizing medium duct 37, formed in the control block 46, and via the groove 70.

In other words, valid for all exemplary embodiments, according to FIG. 8*a*, four webs are formed in the through bore 62 with three circumferential annular ducts 70, 72, 74 arranged between them.

Wherein two fits 80, 82 are formed at the end sections of the through bore 62.

The third hydraulic interface 36 is provided as an inflow/outflow of pressurizing medium such that pressurizing medium which flows in or out is provided in both grooves 70, 74.

In the case of the tandem cylinder, both internally situated hydraulic interfaces 20, 36 are tapped by means of the adapter socket according to FIG. 7, wherein the second hydraulic interface 20 is fluidically connected to the second piston space 16 via the groove 72 and an assigned radial bore 82, and a longitudinal bore 84 of the adapter socket 50.

The third hydraulic interface 36 is connected, via the groove 70, to the pressurizing medium duct 37 which opens into the groove 74. For the purpose of tapping the latter, at least one radial bore 86 configured as a blind bore is provided. A radial/axial duct 88 angled in the direction of the bore axis 64 extends in each case from this radial bore or these radial bores 86 toward a recess 90, arranged opposite the recess 64, at the end of the adapter socket 50. The third piston space 32 communicates with the recess 90. The second cylinder tube 38 penetrates a radial widened portion 104 of the recess 90 and centered as a result.

The adapter socket 50 according to FIGS. 6 and 7 thus taps, for the tandem cylinder 6 mounted on the hydraulic control block 46 (compare also FIGS. 4*a*, 5*b*, 5, 6), the internally situated hydraulic interfaces 20, 36 and conveys pressurizing medium into the piston spaces 16, 32 provided in the case of this structural form of the cylinder.

Figure 4A:
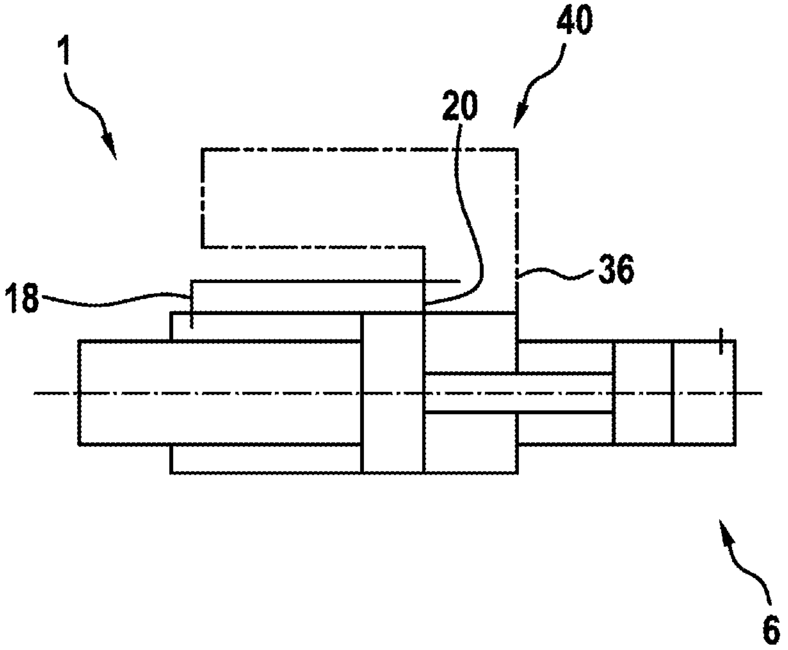
Figure 4B:
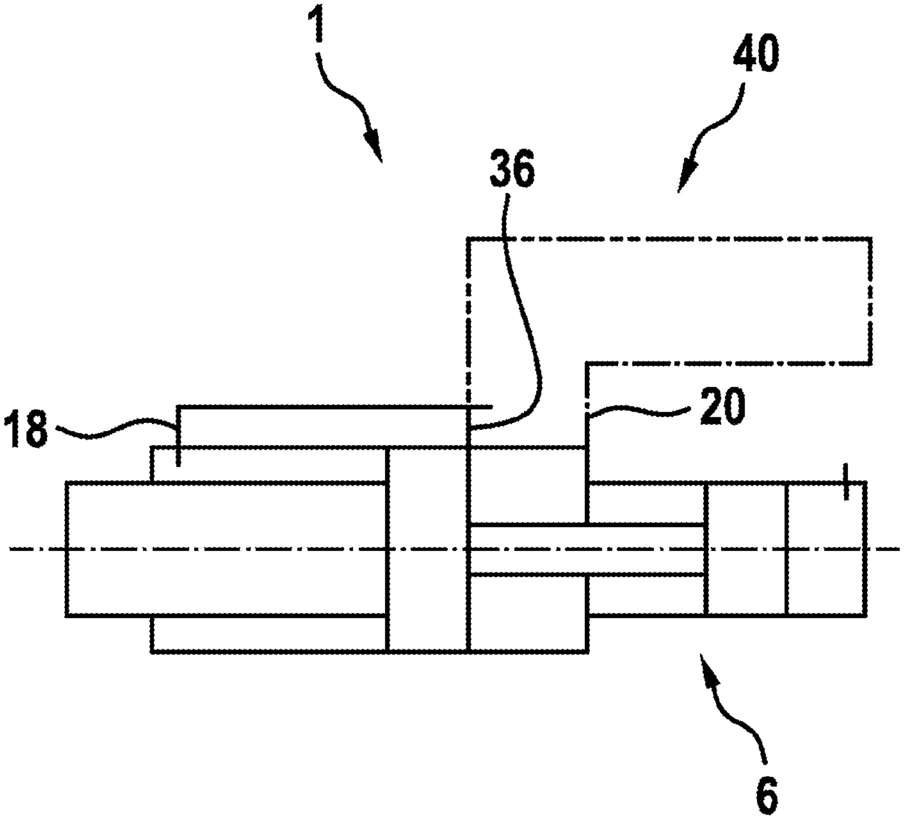
Figure 5:
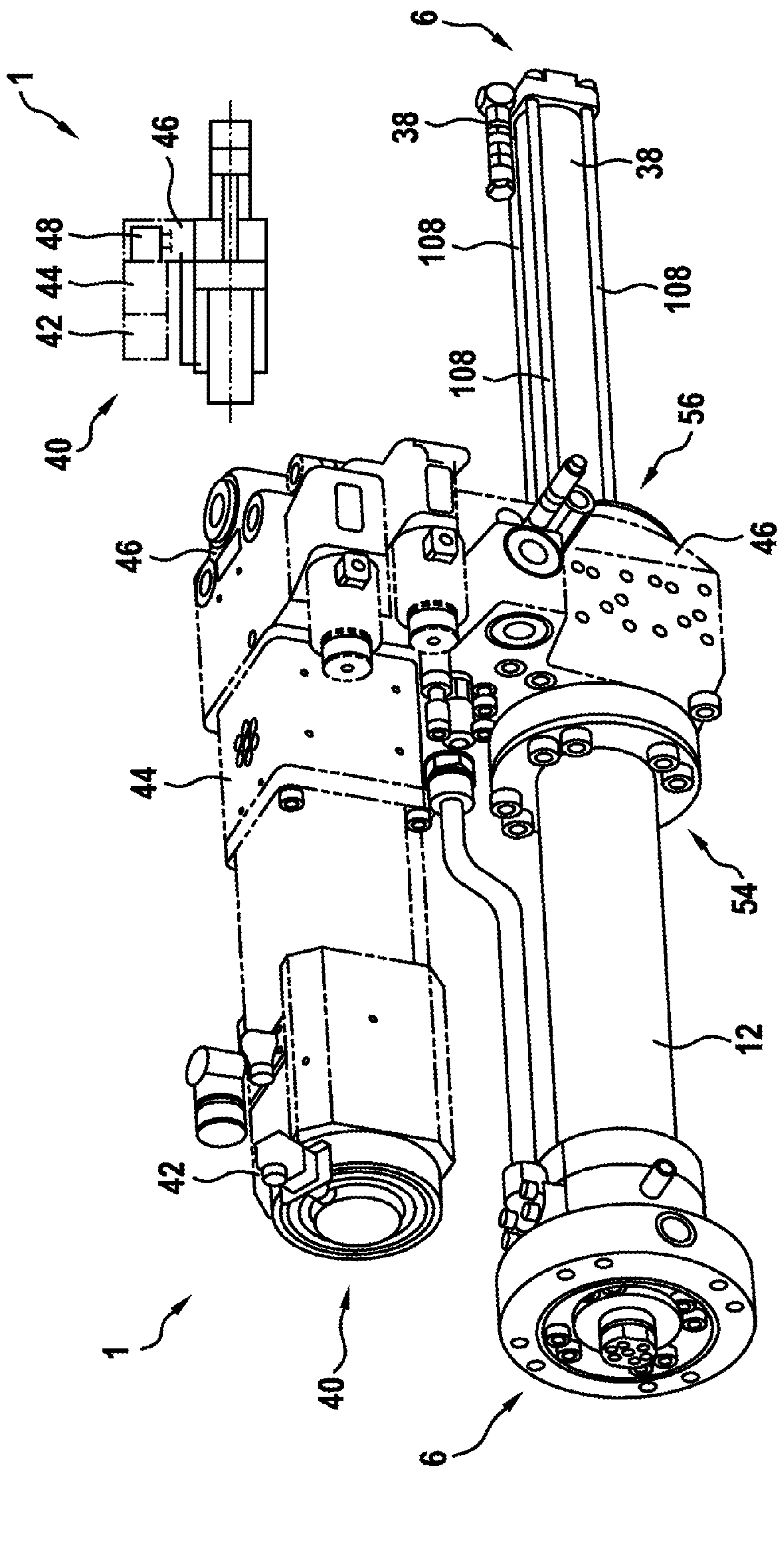
FIG. 5 shows the hydraulic axle according to FIG. 4 in a partially perspective view.

Because the inner lateral surface 68 of the through bore 62 is rotationally symmetrical and additionally mirror-symmetrical with respect to the plane of symmetry 66 and hence to a central plane of the hydraulic control block 46, it is possible to arrange the complete input drive module 40 rotated by 180°, as illustrated in FIGS. 4*a*, 4*b* and FIG. 6.

The internally situated hydraulic interfaces 20, 36 are then connected in the same way to the piston spaces 16, 32. The same arrangement, rotated by 180°, is also possible for the other structural forms of a differential cylinder 2 and a double-rod cylinder 4 by virtue of the internally situated hydraulic interfaces 20, 36 and their openings 70, 74, and 72 arranged symmetrically with respect to the plane of symmetry 66.

Figure 8B:
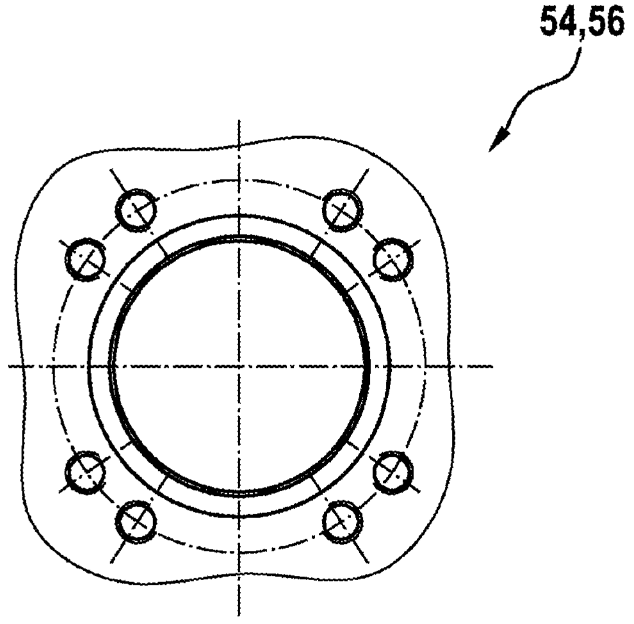
FIG. 8*b* shows mounting interfaces on the control block, valid for all the exemplary embodiments.

According to FIG. 8*b*, the same mounting interfaces in the form of an identical mounting bore layout 54, 56 are provided as mechanical interfaces on both sides of the through bore 62, i.e. on both sides of the plane of symmetry 66. This layout can be used for mounting the respective hydraulic cylinder 2, 4, 6 and other components.

According to FIG. 7, the adapter socket 50 is mounted in the hydraulic control block 46 via the cover 58 designed as a ring nut flange. For this purpose, the ring flange 58 is designed with an internal thread 92 and screwed onto an end section 94, on the control block side, of the first cylinder tube 12 which has an external thread. The ring flange 58 is thus screwed on far enough that an annular end face of the first cylinder tube 12 projects from the ring flange 58 with a clearance 96. The ring flange 58 is mounted or screwed on the hydraulic control block 46 by means of tensioning screws 98. As a result and by virtue of the gap 96 provided for clamping, the adapter socket 50 is clamped in the hydraulic control block 46 via the annular end face of the first cylinder tube 12 which is supported on the end of the adapter socket 50. To be more precise, for this purpose a radial collar 100 of the adapter socket 50 is in this way supported and pretensioned on a radial widened portion 102 of the through bore 62. The adapter socket 50 is thus installed in a statically determined fashion. This method, known per se, of mounting a cylinder tube via the ring flange on the hydraulic control block can also be performed with the adapter socket 50, wherein the adapter socket 50 is held in position with distinct frictional contact over a short distance.

The second cylinder tube 38 is mounted on the opposite side 78 of the control block 46 and the through bore 62 is closed by the second cover 60. The second cylinder tube 38 here traverses the second cover 60 with some play, i.e. stresslessly, penetrates the radial widened portion 104 of the recess 90 of the adapter socket 50 and is supported there at its end. The second cover 60 is mounted directly and in an abutting fashion on the side 78 of the control block 46 by means of tensioning screws 106. Independently thereof, the second cylinder tube is mounted via tension rods 108 (compare FIG. 5). Tension rods 108 are screwed into threaded bores 110 of the adapter socket 50 by their end sections and traverse the second cover 60 stresslessly, as described already for the second cylinder tube 38.

The second cover 60 consequently has no force-transferring function for the mounting of the second cylinder tube 38. This is effected exclusively by the above described adapter socket 50 installed in a way that is determined with frictional contact over a short distance. As a result, two pretensioning situations which can be calculated independently and simply are provided for mounting the first cylinder tube 12, on the one hand, and the second cylinder tube 38, on the other hand.

In particular in the case of hydraulic cylinders with two cylinder tubes centered and mounted on the control block 46, as is the case for the tandem cylinder 6, the adapter socket 50 has an advantageous centering and additionally coaxially orienting function with respect to the cylinder tubes 12, 38.

The centering and/or coaxial orienting function can be produced easily by the through bore 62 being bored, the respective adapter socket 50 being manufactured by being turned, and the radial widened portion 104 and the opposite collar 112 thus being provided on it.

The second cylinder tube 38 is centered on the radial widened portion 104, and the first cylinder tube 12 is centered on the collar 112.

This centering and, associated therewith, the mutual coaxial orientation bring advantages in terms of the frictional behavior of the hydraulic cylinder and minimize the wear between the pistons and the cylinder tubes.

Figure 9:
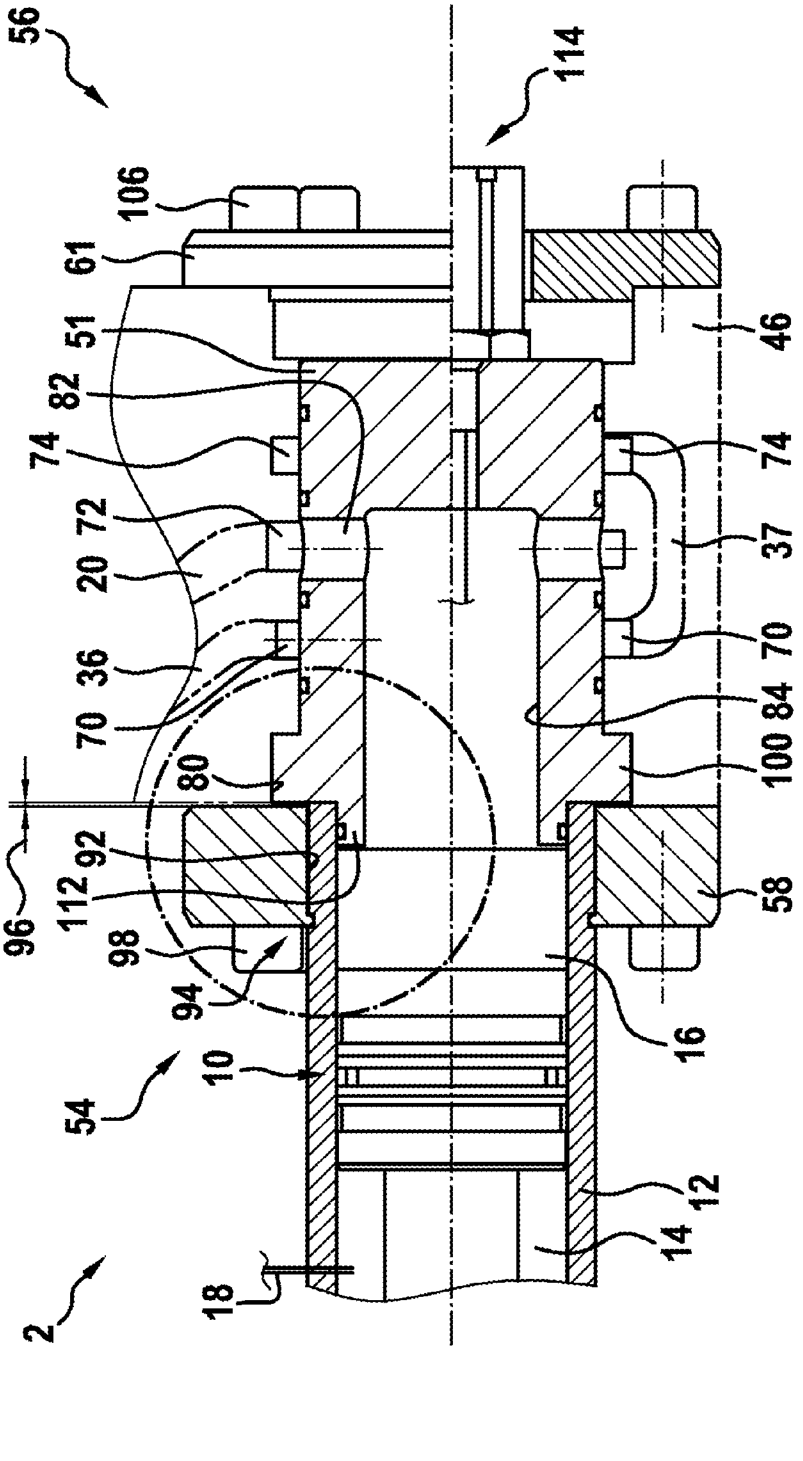
FIG. 9 shows the hydraulic axle according to FIG. 2*c* in a detailed view in the region of the control block and the adapter socket.

FIG. 9 shows a base of a differential cylinder 2, wherein the base is formed by an adapter socket 51. The second piston space 16 is here supplied with pressurizing medium via the second hydraulic interface 20 arranged inside the control block 46. For this purpose, the second piston space 16 is fluidically connected to the second interface 20 via the annular groove, or the opening 72 and the radial bore 82, and the recess 84. The second hydraulic interface 20 is thus tapped, whereas the third hydraulic interface 36 arranged inside the control block 46 is not tapped, i.e. is blocked. This blocking is here effected by means of the design of the adapter socket 51 which is adapted to the differential cylinder 2. The first piston space 14 is, as in the preceding exemplary embodiment, supplied with pressurizing medium via the hydraulic interface 18' arranged outside the control block 46, the hydraulic tube 52, and the port 18 (cf FIG. 6). The mounting of the adapter socket 51 and the first cylinder tube 12 on the control block 46 is identical to the preceding exemplary embodiment such that any explanation of this has been omitted. The same applies to a second cover 61 according to FIG. 9, wherein, in a variation, the latter is not traversed by a second cylinder tube (cf FIG. 7) and instead is closed. A displacement measuring device in the form of a rod displacement measuring system 114 is optionally provided, traversing the second cover 61 and a base of the adapter socket 51.

In a variation from the exemplary embodiment illustrated according to FIG. 9, the second piston space 16 can be supplied with pressurizing medium via the third hydraulic interface 36 instead of via the second hydraulic interface 20. For this purpose, the radial bore 82 illustrated must then be closed and one or more radial bores must be provided in the region of the annular groove 70.

Figure 10A:
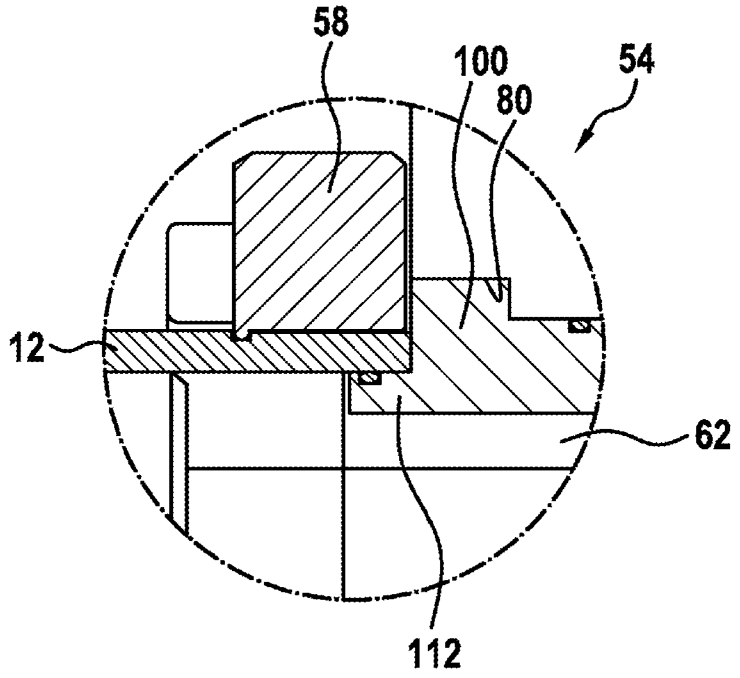
FIGS. 10*a* and 10*b* show a detail of the section according to FIG. 9, with the use of different cylinder tubes according to exemplary embodiments.
Figure 10B:
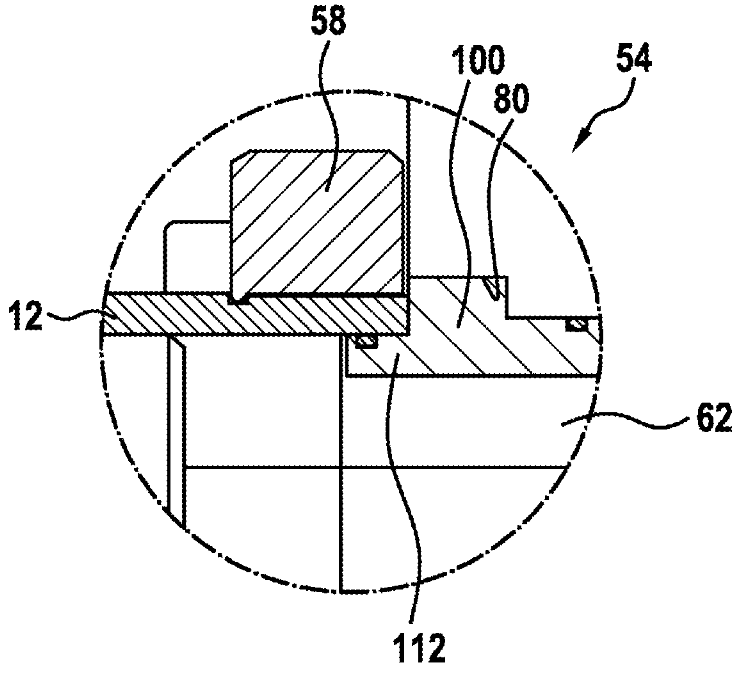

FIGS. 10*a* and 10*b* show that, with the same through bore 62 and also the otherwise same mounting interfaces 54, 56, cylinder tubes of a different diameter can be connected just by changing the collar 112 of the adapter socket 50; 51; 53. Just by varying the collar 112 or centering collar, this is readily possible without having to intervene in the rest of the hydraulic control block 46. A first cover 58 which is adapted to the changed cylinder tube is, however, necessary.

Figure 11:
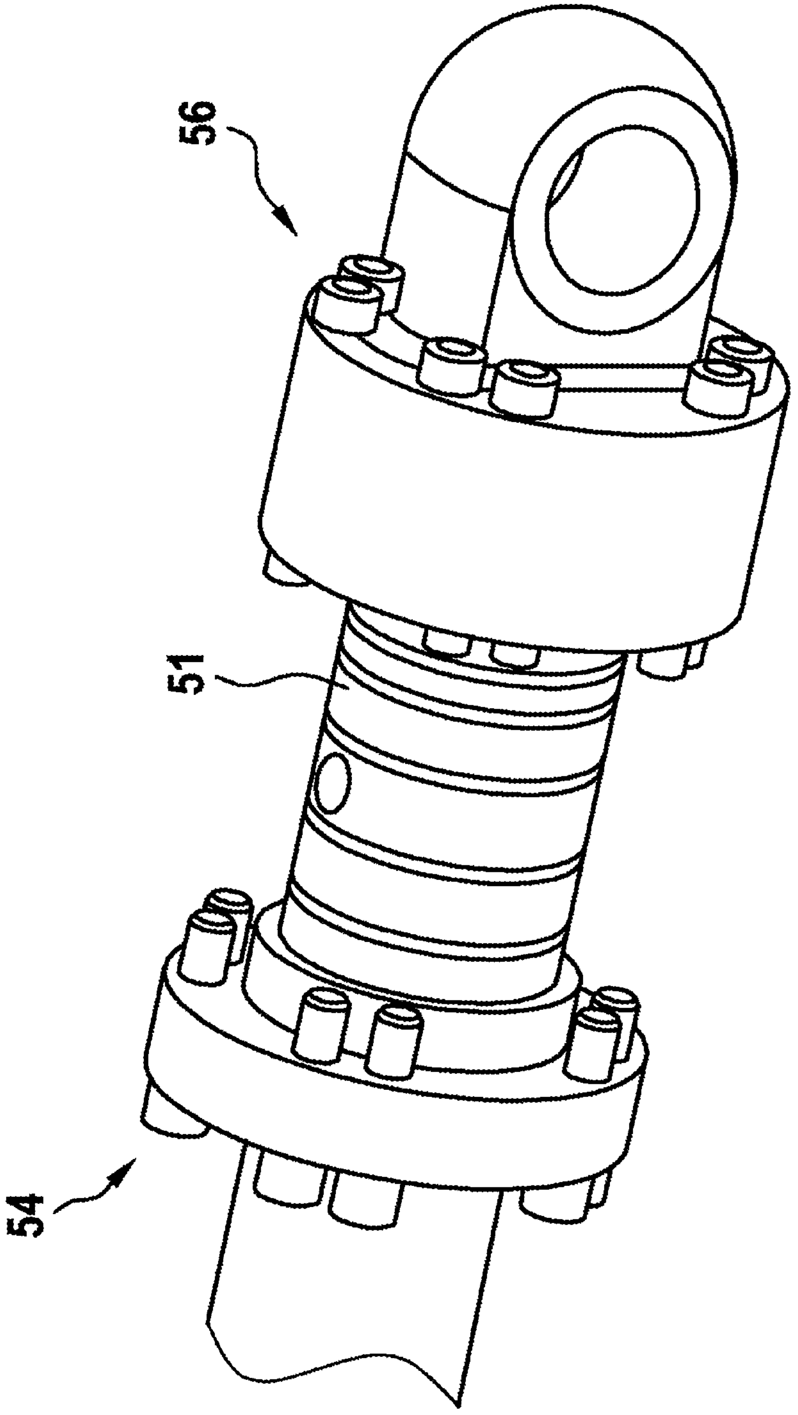
FIG. 11 shows mounting interfaces and an adapter socket, shown separately, according to an exemplary embodiment.

As is the case for all the exemplary embodiments, the uniform interfaces 20, 36, 18', 54, 56 furthermore make it possible to structurally implement conventional types of cylinder mounting. The MP3/MP5 mounting type is thus illustrated, for example, in FIG. 11. The input drive module with an electric motor, clutch, hydraulic machine, and control block is thus not illustrated, such that the adapter socket 51 is shown separately.

Figure 3A:
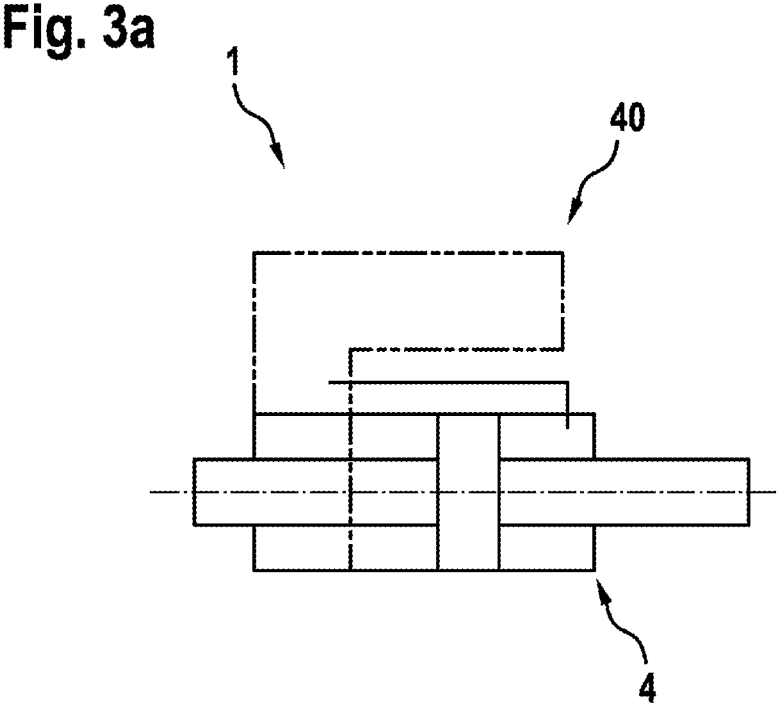
Figure 3B:
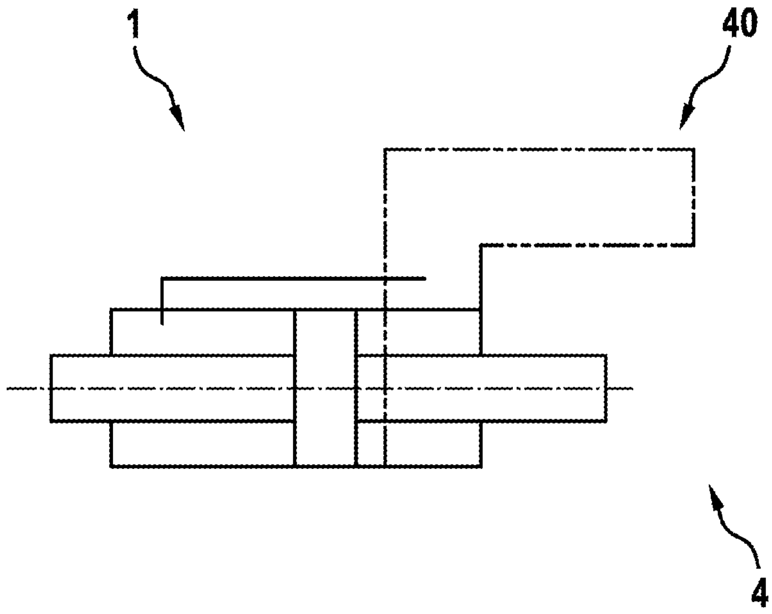
Figure 3C:
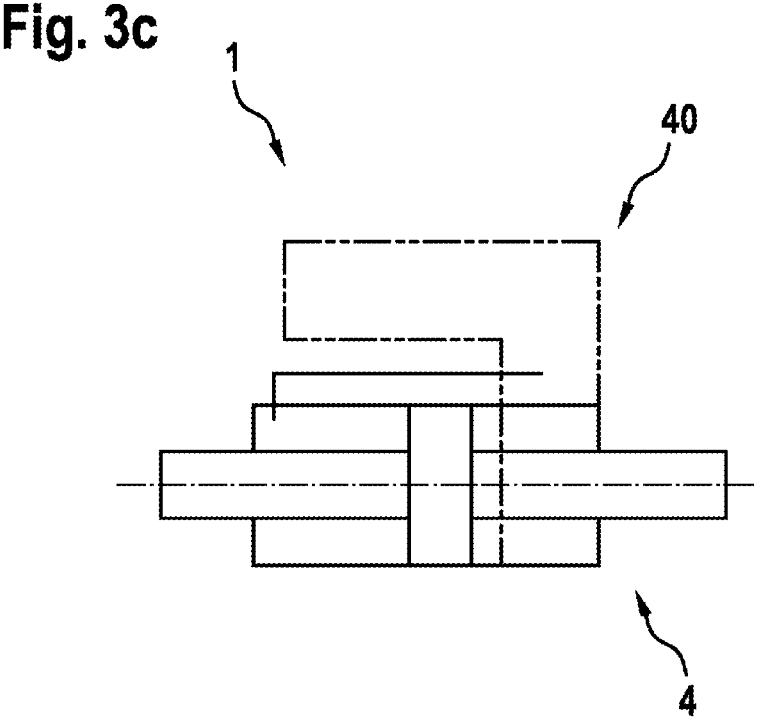
Figure 12:
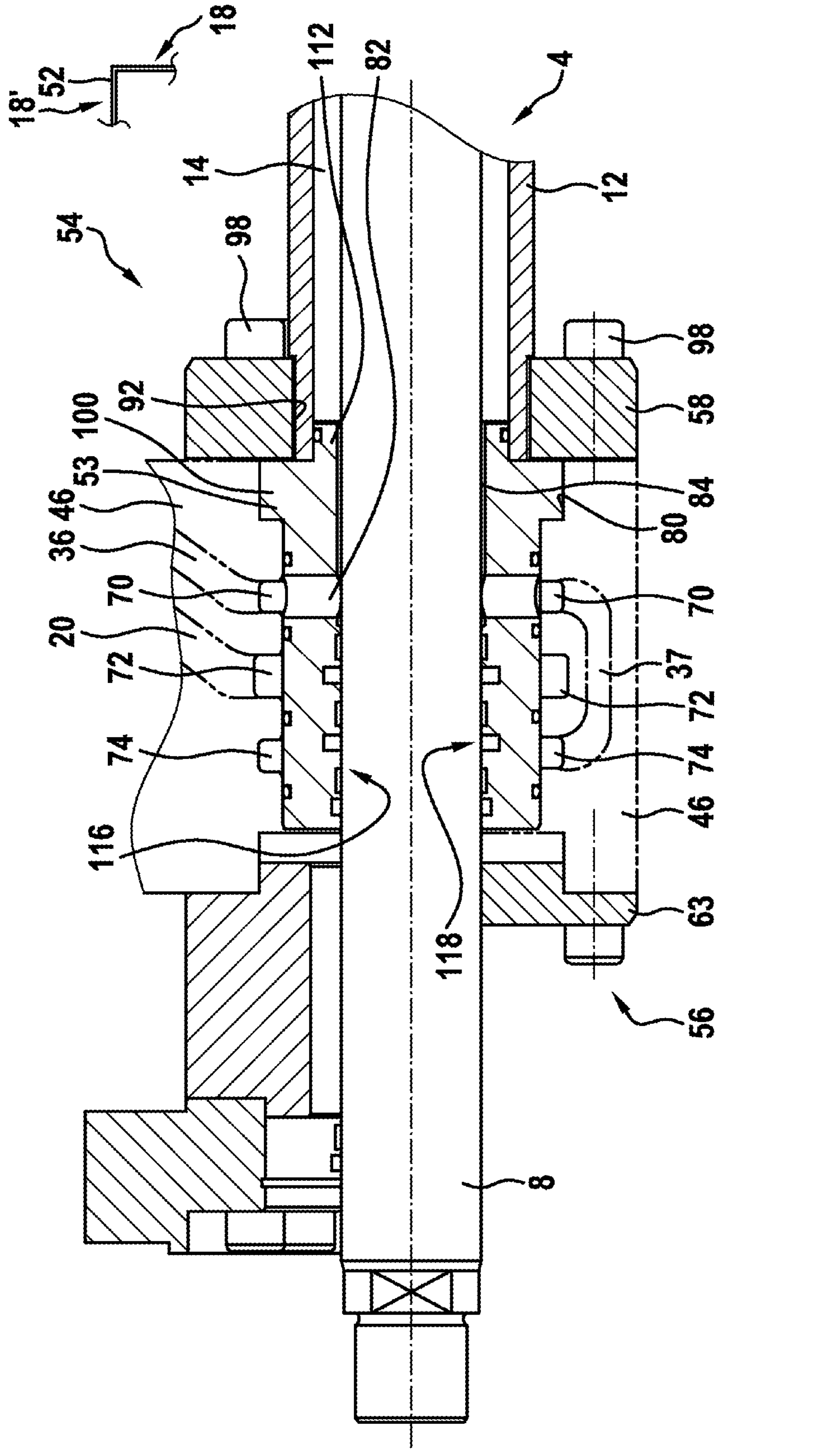
FIG. 12 shows the hydraulic axle according to FIG. 3*a* in a longitudinal section in a region of the adapter socket.

FIG. 12 shows the situation according to the configuration from FIG. 3*a* with a double-rod cylinder 4 which is mounted with one of its cylinder heads on the hydraulic control block 46. Accordingly, as can be seen in FIG. 3*a* and is discernible from the path of the pressurizing medium ducts of the hydraulic interfaces 20, 36, the control block 46 is rotated by 180° about its vertical axis. The first cover 58 is accordingly then arranged on the right in FIG. 12, and a second cover 63 on the left. An adapter socket 53, which is adapted to this structural form of the hydraulic cylinder 4, is inserted into the through bore 62.

According to FIG. 12, the adapter socket 53 taps the third hydraulic interface 36 arranged inside the hydraulic control block 46 via the radial bore 82. The first piston rod 8 completely traverses the adapter socket 53. An annular space 84, leading to the first piston space 14 and via which the third hydraulic interface 36 is fluidically connected to the first piston space 14, is defined between the first piston rod 8 and the adapter socket 53. The second hydraulic interface 20, likewise arranged inside the control block 46, is blocked by the adapter socket 53. The adapter socket 53 can also be used for a differential cylinder in the structural form of the hydraulic axle 1 according to FIG. 2*a*. In this case, it is possible to tap the interface 20 and fluidically block the interface 36.

In the exemplary embodiment shown according to FIG. 12, the adapter socket 53 forms a guide and sealing system 116 and 118 for the first piston rod 8. For the other exemplary embodiments too, in which one of the piston rods traverses the adapter socket, it is the case that, when changing to a different piston rod diameter, all that is required is to adapt the relevant adapter socket or simply replace it with a different, prepared adapter socket. There is thus no longer any need to machine the control block 46 because, as already explained many times, the through bore 62 and the internally arranged hydraulic interfaces 20, 36 with their openings 72 and 70, 74 are and remain generic.

Independently of the exemplary embodiments shown, the production of many different and hence expensive control blocks is avoided by virtue of the internally situated hydraulic interfaces of the control block which are the same for multiple structural forms, the adapter socket adapted to the respective hydraulic cylinder used, and additionally the mounting interfaces which are the same for multiple structural forms. Instead, a common control block base body can be constructed, manufactured, and stored for a number of hollow cylinders which can be used selectively. The additionally used adapter socket of the control block here represents a very simply producible turned part with bores and has no compulsory milling processes. Compared with conventional control blocks which always need to be manufactured so that they are adapted to specific structural forms of the hydraulic cylinder, this complexity is thus shifted to the adapter socket and consequently also significantly reduced.

In addition to the symmetrical design of the mounting interfaces, the through bore, and the hydraulic interfaces, there is also the advantage of spatially positioning the input drive module relative to the hydraulic cylinder in an extremely flexible fashion.

A hydraulic control block for connecting a plurality of structural forms of a hydraulic cylinder to be supplied with pressurizing medium is disclosed, wherein mounting and hydraulic interfaces are provided for the plurality of structural forms on the control block, facing the hydraulic cylinder, and wherein, depending on the structural form, at least some of the hydraulic interfaces are tapped or blocked or deactivated by a removably provided insert part, in particular an adapter.

Also disclosed is a hydraulic axle therewith and with a hydraulic cylinder connected at least hydraulically to the control block.

The invention claimed is:

1. A hydraulic control block arrangement for controlling a supply of pressurizing medium to an electrohydraulic or servo hydraulic axle, comprising:

a hydraulic control block defining a plurality of internally situated hydraulic interfaces configured to fluidically connect at least one of a source of pressurizing medium and a pressurizing medium sink of the axle to at least one piston surface of any hydraulic cylinder selected from a group of hydraulic cylinders of different structural forms, wherein the internally situated hydraulic interfaces are configured to selectively supply pressurizing medium to the selected hydraulic cylinder; and an insert part fixed relative to the hydraulic control block and configured as a function of the structural form of the selected hydraulic cylinder such that each of the plurality of internally situated hydraulic interfaces is either tapped for fluidic connection through the insert part or blocked from fluidic connection by the insert part, wherein the insert part blocks at least one of the plurality of internally situated hydraulic interfaces from fluid connections.

2. The control block arrangement as claimed in claim 1, wherein one of:

the insert part is an adapter to removably connected to the selected hydraulic cylinder; and the insert part forms a structural unit with at least a section of the selected hydraulic cylinder.

3. The control block arrangement as claimed in claim 1, wherein the structural form of the selected hydraulic cylinder is determined at least by one or more of a number of piston surfaces of the at least one piston surface, a piston surface ratio, and a diameter of a cylinder tube of the selected hydraulic cylinder.

4. The control block arrangement as claimed in claim 3, the hydraulic control block further comprising:

at least one externally situated hydraulic interface, via which the at least one of the piston surfaces is fluidically connected to the at least one of the source of pressurizing medium and the pressurizing medium sink of the axle.

5. The control block arrangement as claimed in claim 1, the hydraulic control block further comprising:

a bore into which the insert part is inserted.

6. The control block arrangement as claimed in claim 5, wherein the bore:

is introduced into a side face of the control block; and has a radially widened circumferential recess into which a radial collar of the insert part is inserted and on which the radial collar is supported.

7. The control block arrangement as claimed in claim 5, wherein:

the bore is a through bore; and the through bore is symmetrical with respect to a direction of the through bore or has at least a symmetrical basic shape.

8. The control block arrangement as claimed in claim 5, wherein the internally situated hydraulic interfaces have axially spaced apart openings into the bore.

9. The control block arrangement as claimed in claim 8, wherein the openings extend over at least a part of an inner circumference of the bore as grooves.

10. The control block arrangement as claimed in claim 8, wherein respective tapping points assigned to the respective axially spaced apart openings have respective transverse or radial bores in the insert part which are at least partially covered by the respective axially spaced apart openings.

11. The control block arrangement as claimed in claim 5, wherein the plurality of internally situated hydraulic interfaces includes:

a first internally situated hydraulic interface with a first opening into the bore; and a second internally situated hydraulic interface with two second openings into the bore.

12. The control block arrangement as claimed in claim 11, wherein the two second openings are arranged symmetrically, in a direction along the bore, with respect to the first opening.

13. The control block arrangement as claimed in claim 11, wherein the first and second internally situated hydraulic interfaces are tapped.

14. The control block arrangement as claimed in claim 11, wherein one of the first and second internally situated hydraulic interfaces is tapped and the other is blocked.

15. The control block arrangement as claimed in claim 1, wherein the insert part is formed by an adapter socket that defines a through recess which is configured to be traversed by a piston rod of the selected hydraulic cylinder.

16. The control block arrangement as claimed in claim 15, wherein an inner lateral surface of the through recess of the adapter socket forms at least one of a guide and a bearing point on which the piston rod of the selected hydraulic cylinder is guided or bears.

17. The control block arrangement as claimed in claim 16, wherein the at least one sealing element and the piston rod seal one of the at least one piston surfaces from another of the at least one piston surfaces.

18. The control block arrangement as claimed in claim 16, wherein one of the at least one piston surfaces sealed from the atmosphere via the at least one sealing element and the piston rod.

19. The control block arrangement as claimed in claim 16, further comprising:

at least one sealing element arranged on the inner lateral surface of the through recess of the adapter socket.

20. A hydraulic axle comprising:

the hydraulic control block arrangement as recited in claim 1; and the selected hydraulic cylinder, wherein at least one of the at least one piston surfaces is fluidically connected to one of the plurality of internally situated hydraulic interfaces via a tapping point of the insert part.

* * * * *